US 7,421,461 B2

(12) United States Patent  (10) Patent No.: US 7,421,461 B2
Prokop  (45) Date of Patent: Sep. 2, 2008

(54) PIPE REFERENCE AND CALCULATING DEVICE

(76) Inventor: Christopher A. Prokop, 1263 Van Tassell Trail, Palm Bay, FL (US) 32905

( * ) Notice: Subject to any disclaimer, the term of this patent is extended or adjusted under 35 U.S.C. 154(b) by 825 days.

(21) Appl. No.: 11/028,062

(22) Filed: Jan. 4, 2005

(65) Prior Publication Data

US 2005/0160123 A1   Jul. 21, 2005

Related U.S. Application Data

(60) Provisional application No. 60/536,715, filed on Jan. 16, 2004.

(51) Int. Cl.
   G06F 15/02     (2006.01)
   G01B 1/00      (2006.01)
(52) U.S. Cl. .................................. 708/130; 33/529
(58) Field of Classification Search ............ 708/130; 33/529
   See application file for complete search history.

(56) References Cited

U.S. PATENT DOCUMENTS

| | | | |
|---|---|---|---|
| 3,979,057 A | 9/1976 | Katz et al. | |
| 4,035,627 A | 7/1977 | Dickinson et al. | |
| 4,078,251 A | 3/1978 | Hamilton | |
| 4,107,782 A | 8/1978 | Cochran | |
| 4,139,893 A | 2/1979 | Poland | |
| 4,383,301 A * | 5/1983 | Morita et al. | 702/163 |
| 4,475,165 A | 10/1984 | Rizk et al. | |
| 4,695,983 A | 9/1987 | Oda et al. | |
| 4,744,044 A | 5/1988 | Stover et al. | |
| 4,823,311 A | 4/1989 | Hunter et al. | |
| 4,852,057 A | 7/1989 | Patton | |
| 5,111,426 A | 5/1992 | Bergstresser, Sr. et al. | |
| 5,265,029 A | 11/1993 | Ramsay | |
| 5,836,666 A | 11/1998 | Aoyama et al. | |
| 6,167,412 A | 12/2000 | Simons | |
| 6,854,190 B1 * | 2/2005 | Lohmann | 33/1 SB |
| D540,372 S * | 4/2007 | Young | D18/7 |
| 2003/0126166 A1 | 7/2003 | Good et al. | |

FOREIGN PATENT DOCUMENTS

DE       44 44 214 A1    6/1996
WO       WO 91/03787 A1  3/1991

* cited by examiner

*Primary Examiner*—Chuong D Ngo

(57) ABSTRACT

A pipe reference and calculating device pipe reference and calculating device includes a housing that can be held in a hand of a user. A processor is contained within the housing. A keypad is on the housing and is electrically connected to the processor. The keypad operates a plurality of switches, each switch controlling a circuit to produce an input signal to the processor for a desired function. A display screen and a memory device are disposed in the housing and are electrically connected to the processor. Software is stored in the memory device. The software causes the processor access data from a database of pipe reference information and data, and formulas, perform pipefitting calculations with data accessed from the database, perform calculations on data input from the keypad, and perform pipefitting and geometric calculations using graphical images with labeled variables.

16 Claims, 19 Drawing Sheets

PIPE REFERENCE AND CALCULATING DEVICE

CROSS-REFERENCE TO RELATED APPLICATION

This application claims the benefit of U.S. Provisional Patent Application Ser. No. 60/536,715, filed Jan. 16, 2004.

BACKGROUND OF THE INVENTION

1. Field of the Invention

The present invention relates generally to electronic calculating devices. In particular, the invention relates to a handheld calculating device having a complete pipe reference source for solving a variety of piping problems.

2. Description of Related Art

Pipe fitters, pipe fabricators, and plumbers all have jobs that require pipe fabrication and/or installation. Pipe fitting tasks typically require a person to use a calculator, and to refer to reference books for data and formulas for solving a variety of piping problems that occur during the fabrication and/or installation pipes. One problem is that most fitters, fabricators, welders, plumbers and others working with pipes do not learn enough mathematics to realize their full potential, so that many workers do not have the ability to remember the formulas required, or require considerable time to figure out how to use a formula properly, even with the assistance of an electronic calculator. This results in the craftsman having to use far less accurate calculations and more time consuming methods to fabricate or fit the piping being worked on.

Every project superintendent that has any sizable amount of piping on their job knows that among the journeyman there are many different skill levels. A person in supervision is charged with the duty of assigning the appropriate tasks to the appropriate journeyman. More often than not there is the problem of not enough craftsmen with a high level of skill to go around. The calculator of the present invention is the equalizer a craftsman needs to bring him or her to a higher level of performance in order to enjoy a previously unattainable level of success in their career. This translates into a higher earning potential and more efficient job performance.

Various calculating devices have been programmed to provide various functions for assisting work related activities. However, the relevant art does not provide a calculator capable of performing the necessary calculations required for pipe fabrication and/or installation. Nor does the relevant art provide such a calculator having a graphical interface to assist a user in performing the necessary calculations required for pipefitting applications.

U.S. Pat. No. 5,111,426, issued May 5, 1992 to Bergstresser, Sr. et al., shows a handheld calculator that allows welders to manipulate welding and cutting data for a job at hand. The calculator includes a complete welding reference source providing on-the-spot answers to problems and can calculate data necessary for the completion of a welding task. The calculator includes a saving and retrieving function that allows a user to quickly retrieve information from a subset or compare a calculation to a subset. Similarly, U.S. Pat. No. 6,167,412, issued Dec. 26, 2000 to Simons, discloses a handheld medical calculator and medical reference device having an input keypad and an output screen connected to a processor with memory to perform specific clinical functions. Some of the clinical functions require accessing various medical reference tables to perform complex medical calculations.

U.S. Pat. No. 5,265,029, issued Nov. 23, 1993 to Ramsay, discloses a chemical calculator providing rapid and convenient ways to retrieve information and perform calculations of chemical elements and chemical formulas obtained by direct entry from a periodic table keypad. These calculations allow chemists to compute chemical transformations, reaction yields, limiting reactants, and empirical formulas. U.S. Pat. No. 4,744,044, issued May 10, 1988 to Stover et al., describes a handheld calculator for specialized dimensional calculations. The calculator may be used to calculate the dimensions and unit price of lumber.

U.S. Pat. No. 3,979,057, issued Sep. 7, 1976 to Katz et al., discloses an electronic calculator having a limited stored program capability and which is adapted to perform a plurality of problems particularly useful to aircraft pilots. The programs stored in the calculator cause sequential operation, including the demand for manual entry of necessary data, to calculate a desire result. U.S. patent Publication No. 2003/0126166, published Jul. 3, 2003, discloses a handheld computing device providing instructions for a user to graphically display vectors on a display screen. The device performs vector operations for one or more vectors using an input device while concurrently graphically viewing the vector and the vector changes on the display screen.

Several calculating devices include soft or programmable keys that provide a user with various functions that assist in performing desired calculations. U.S. Pat. No. 4,823,311, issued Apr. 18, 1989 to Hunter et al., shows a calculator keypad having keys with labels created by a display and subject to interactive change as the user desires. Specialized function keys with different functional labels provide a user with various desired functions. U.S. Pat. No. 4,107,782, issued to Cochran, discloses a user programmable calculator having special keys in addition to the numerical and function keys normally incorporated into a calculator in order to facilitate responding to data functional information requests by the calculator.

U.S. Pat. No. 4,680,455, issued Jul. 14, 1987 to Kuo, describes a method of manipulating a calculator using special function keys and instructions from a selected instruction card. The instruction cards provide formulas and equations to achieve various desired calculations. U.S. Pat. No. 4,035,627, issued Jul. 12, 1977 to Dickinson et al., describes a handheld calculator with keys for performing arithmetic, trigonometric, and logarithmic functions. U.S. Pat. No. 4,852,057, issued Jul. 25, 1989 to Patton, discloses a calculating device having stored menus with labels of operations that are performed on mathematical expressions.

U.S. Pat. No. 4,695,983, issued Sep. 22, 1987 to Oda et al., shows a calculator capable of executing formula calculations with different operational sequences. The calculator comprises means for selecting and designating either the sequential operation mode that sequentially executes formula calculations according to individual key operations, or a formula memory operation mode that executes operations after entry of the sequential operation mode. U.S. Pat. No. 4,078,251, issued Mar. 7, 1978 to Hamilton, describes an electronic calculator having an instruction word memory for storing instruction words that is addressable by the address register, and instruction word decoder logic for decoding the instruction words and for controlling the arithmetic unit in response thereto.

None of the above inventions and patents, taken either singly or in combination, is seen to describe the instant invention as claimed. Thus, a pipe reference and calculating device solving the aforementioned problems is desired.

SUMMARY OF THE INVENTION

The present invention is a pipe reference and calculating device. The device includes a housing dimensioned and configured for being held in a hand of a user. A processor is contained within the housing. A keypad is on the housing and is electrically connected to the processor. The keypad operates a plurality of switches, each switch controlling a circuit to produce an input signal to the processor for a desired function. A display screen is disposed in the housing and is electrically connected to the processor. A memory device is disposed in the housing and is electrically connected to the processor. Software is stored in the memory device. The software causes the processor access data from a database of pipe reference information and data, and formulas, perform pipefitting calculations with data accessed from the database, perform calculations on data input from the keypad, and perform pipefitting and geometric calculations using graphical images with labeled variables.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
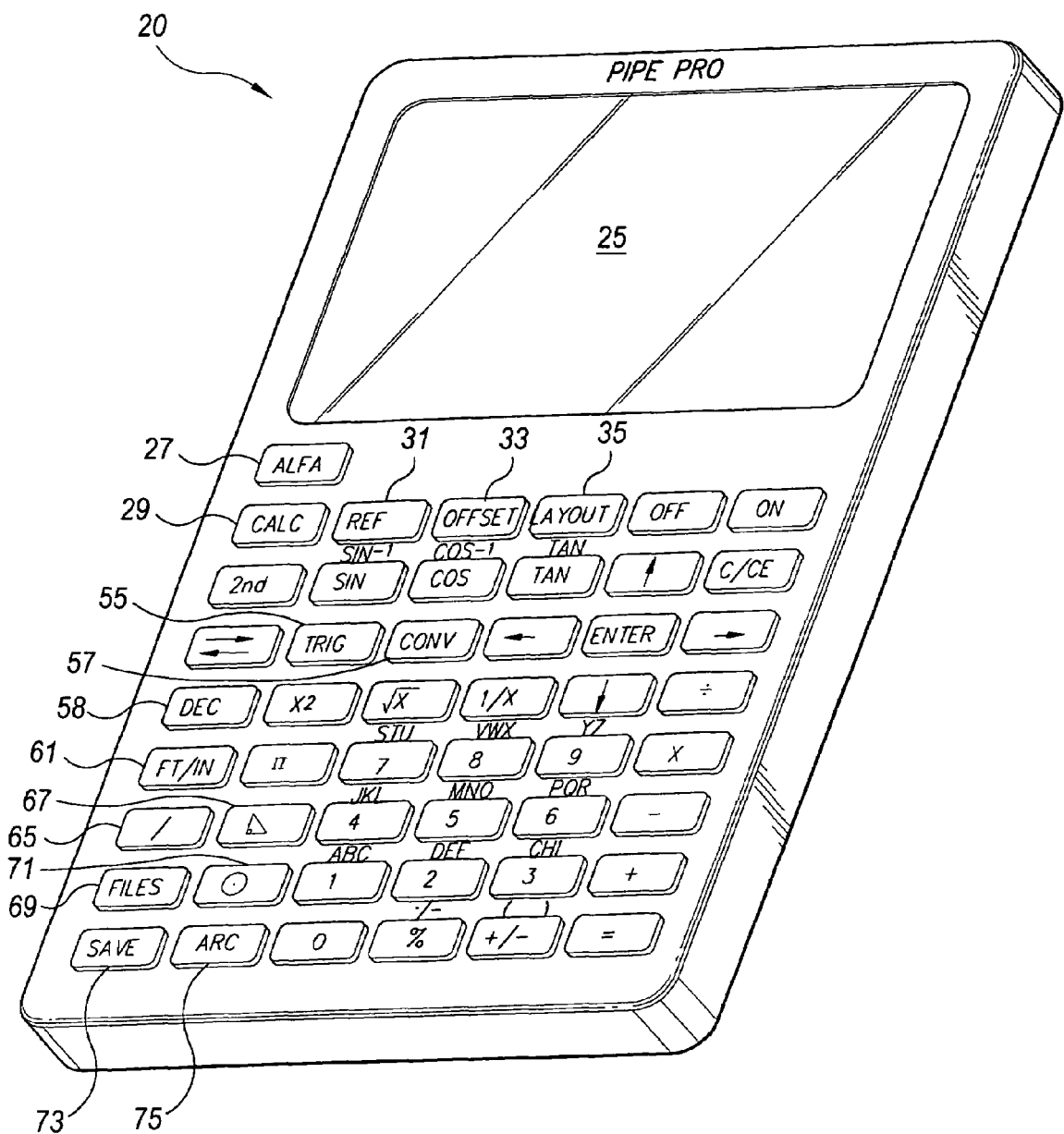
FIG. 1 is a perspective view of a pipe reference and calculating device according to the present invention.

The present invention is pipe reference and calculating device. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

The present invention, represented in FIG. 1, is a pipe reference and calculating device having a software application adapted to assist in the fabrication of pipe and pipefitting related tasks of all types, generally represented as 20 in the drawings. The device 20 calculates the cut length for a vast array of piping offsets and solves pipefitting problems involving arcs, triangles, and circles. The device 20 is provided with a handheld case housing the calculator. The device 20 includes additional keys performing special functions not found on traditional scientific calculators. Keys for these functions are related to the fabrication of pipe and pipefitting related tasks and include a reference key 31 allowing a user to search a variety of reference topics to obtain detailed information about a particular subject; an offset key 33 that brings up a list of offset types to scroll through; a layout key 35 that brings up a list of common piping problems to scroll through; a trig key 55 that brings up a complete trigonometric table to scroll through; and a conversion key 57 that converts from one unit of measurement to another unit of measurement.

Additional keys for these functions include a right triangle solve key 67 for solving right triangles; a circle solve key 71 for solving circles; an arc solve key 75 for solving arc length; a feet/in key 61 for displaying the calculation in feet and inches; a fraction bar 65 for inserting a fraction bar when the calculator is in feet and inches mode; a files key 69 that brings up a list of previously saved files; and a save key 73 that saves the information on the screen 25. Each key will be discussed later in greater detail.

Figure 2:
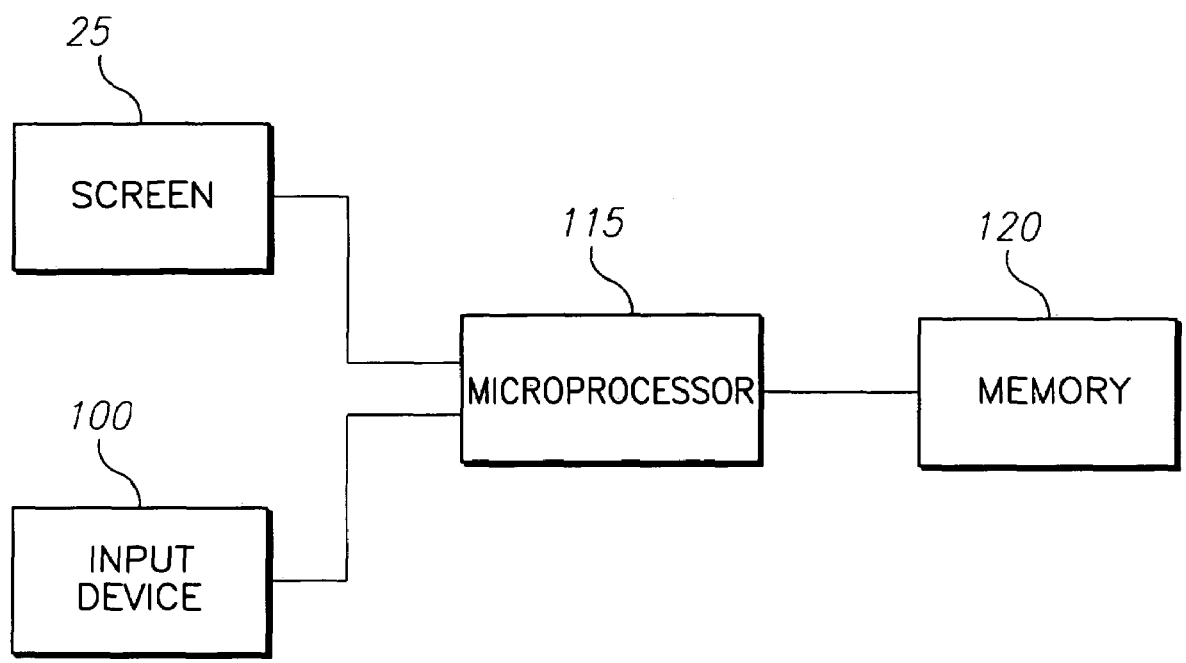
FIG. 2 is a block diagram of a pipe reference and calculating device according to the present invention.

Turning briefly now to FIG. 2, a block diagram illustrates the basic components of the present invention. The device 20 includes a processor 115, a display screen 25, an input device 100, and memory 120. The display screen 25 and the input device 100 are electrically coupled to the processor 115. The display screen 25 may be, e.g., a Liquid Crystal Display (LCD). The input device 100 comprises a keypad with a variety of buttons.

Each button operates an electrical switch controlling a circuit which sends an input signal to the processor 115 in order to carry out a desired function or operation. The display screen 25 has a large display area to accommodate drop down menus and visual aids, providing a graphical interface. Memory device 120 is also electrically coupled to processor 115. Memory deice 120 may include areas of read only memory (ROM) and random access memory (RAM) for permanent and temporary memory storage, respectively. A software application is stored in the memory device 120, and when executed by the processor 115, the software application provides a reference source and a guide for layout information to be used in the fabrication of pipe and pipefitting related tasks of all types.

Figure 3:
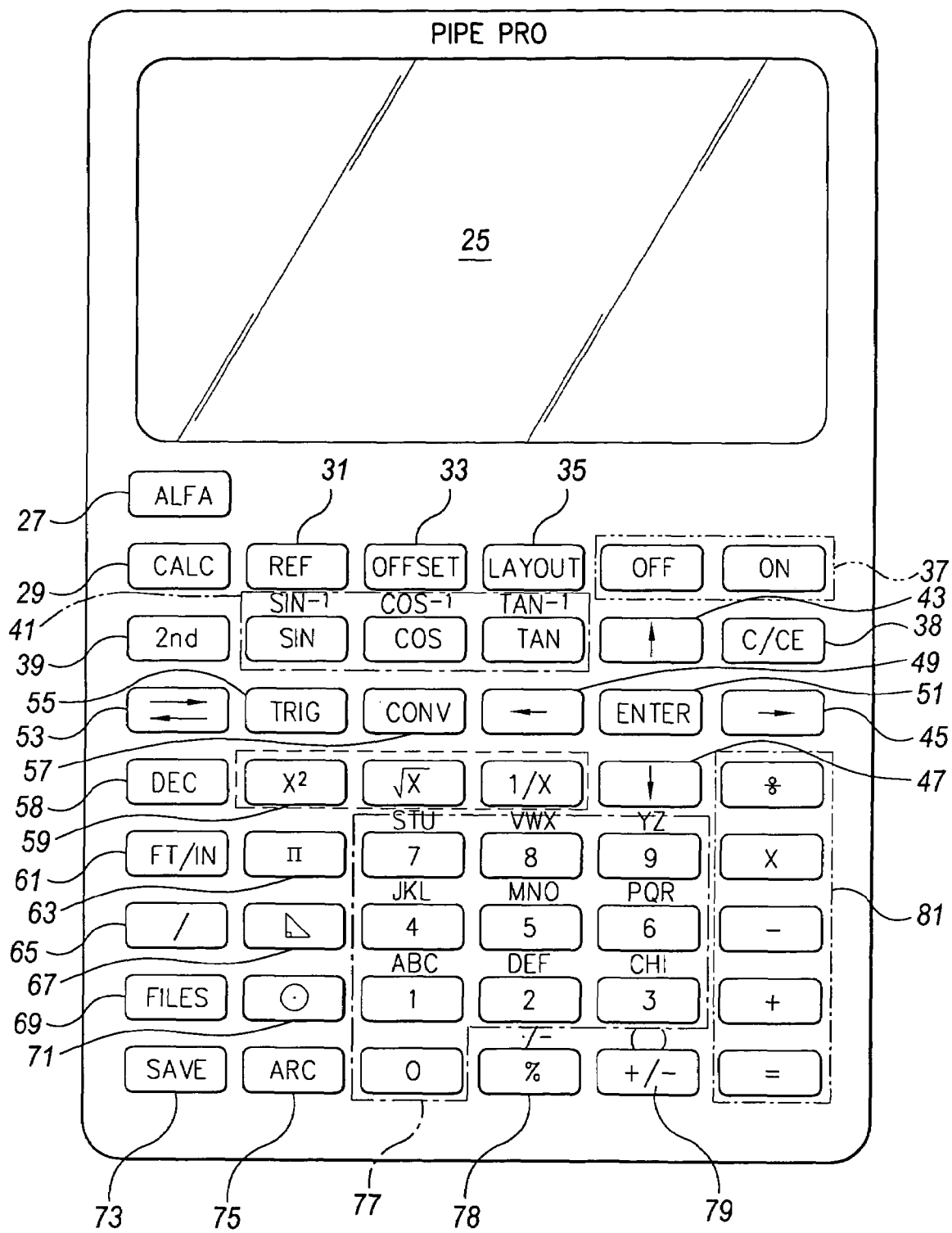
FIG. 3 is a top plan view of a pipe reference and calculating device according to the present invention.

Turning now to FIG. 3, the device 20 includes most of the keys found on many scientific calculators, including: alphanumeric keys 0-9 generally represented by 77; on/off keys 37; a clear key 38 for clearing the screen 25; trigonometric keys 41 for performing basic trigonometric functions, such as sine, cosine, and tangent functions; a second key 39 for performing a secondary function for the next key depressed of certain keys, such as the inverse sine, inverse cosine function, or inverse tangent obtained when depressing the second key 39 and then a trigonometric key 41; scroll arrow keys 43, 45, 47, 49 for allowing a user to navigate through the various menus and lists or to move a cursor; an enter key 51 for bringing up the next list, screen, prompt or answers to problems; a tab key 53 for moving a cursor from point to point in the display; algebraic function keys (squares, square roots, reciprocals) 59; operational keys 81, including division, multiplication, subtraction, addition, and equality signs; a % key 78; and +/− key 79.

Referring briefly back to FIG. 1, a more detailed description of the additional keys performing special functions not found on traditional scientific calculators is given. The trig key 55 brings up a complete trigonometric table to scroll through. This allows users who have become accustomed to looking up trigonometric data in written tables to continue to do so. Files key 69 brings up a list of previously saved files. A user can scroll through the list until the desired file is found. By pressing the enter key 51 when the desired file is highlighted, the calculator 20 will bring the file up from memory. The save key 73 saves the information on the screen into a file. When the save key 73 is pressed, a cursor will appear in the lower portion of the screen 25. A user can then type a number for a file name, or by pressing the alfa key 27 the user can then type notes and file name using the second function of the number keys 77. The decimal key 58 will cause the calculator to display measurements in decimals. The feet and inches key 61 causes the calculator 20 to display measurements in feet and inches. The fraction bar 65 is pressed to insert the fraction bar when the calculator 20 is in feet and inches mode.

Figure 4:
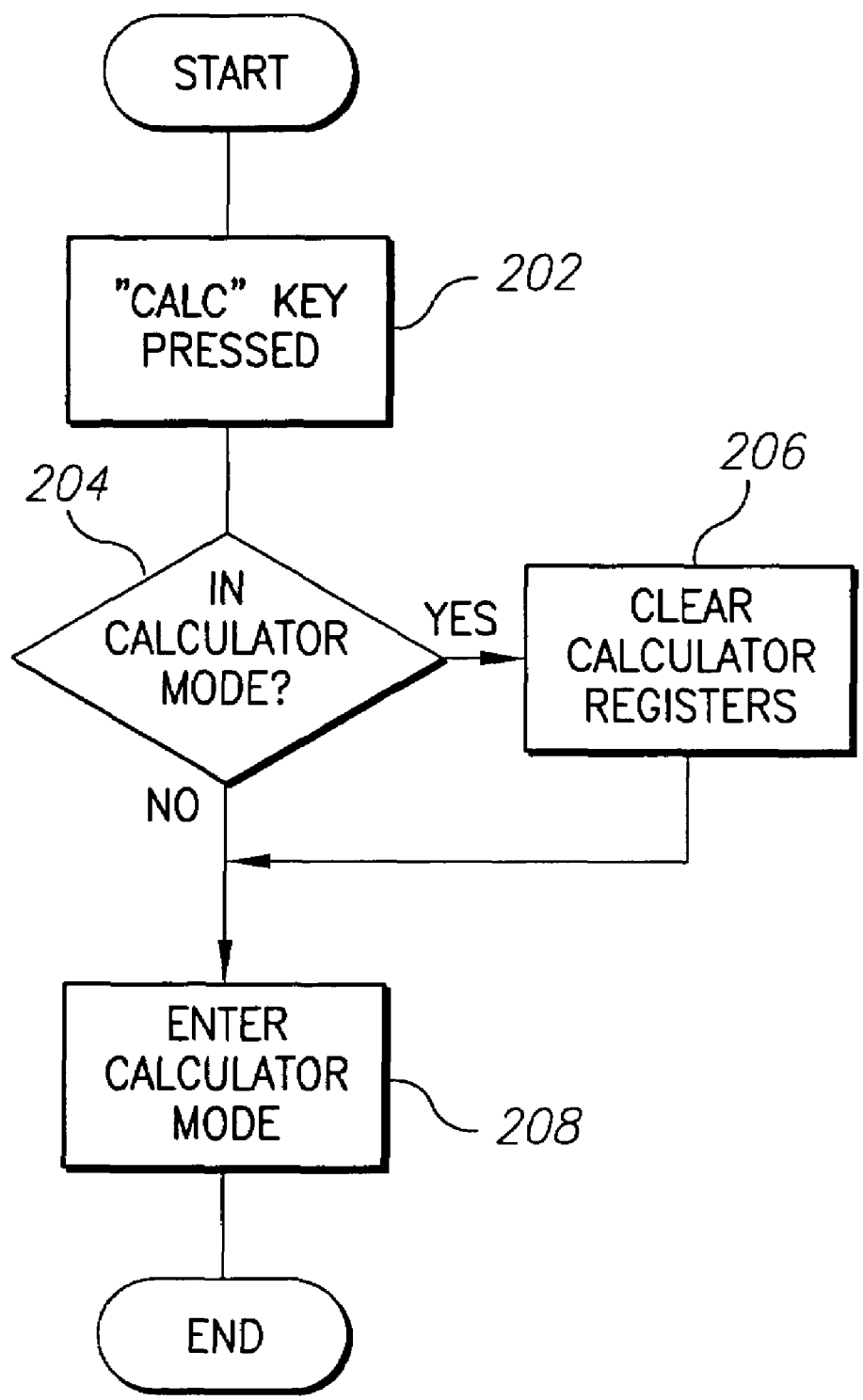
FIG. 4 is a flow chart for operation of the "calc" key of the pipe reference and calculating device of the present invention.

FIG. 4 shows a flow chart describing the function of the calculation or "calc" key 29. When the calculation key 29 is pressed at step 202, processor 115 checks if device 20 is already functioning as a scientific calculator, that is, functioning in calculator mode, at step 204. If device 20 is in calculator mode, any operands and the calculator registers, including any results or instructions for pending calculator functions, are cleared at step 206, and processor 115 enters or re-enters calculator mode at step 208. If device 20 is not in already in calculator mode, processor 115 enters calculator mode at step 208. Hence, pressing the "calc" key has the effect of clearing any pending calculations and re-starting the scientific calculator mode.

Figure 5A:
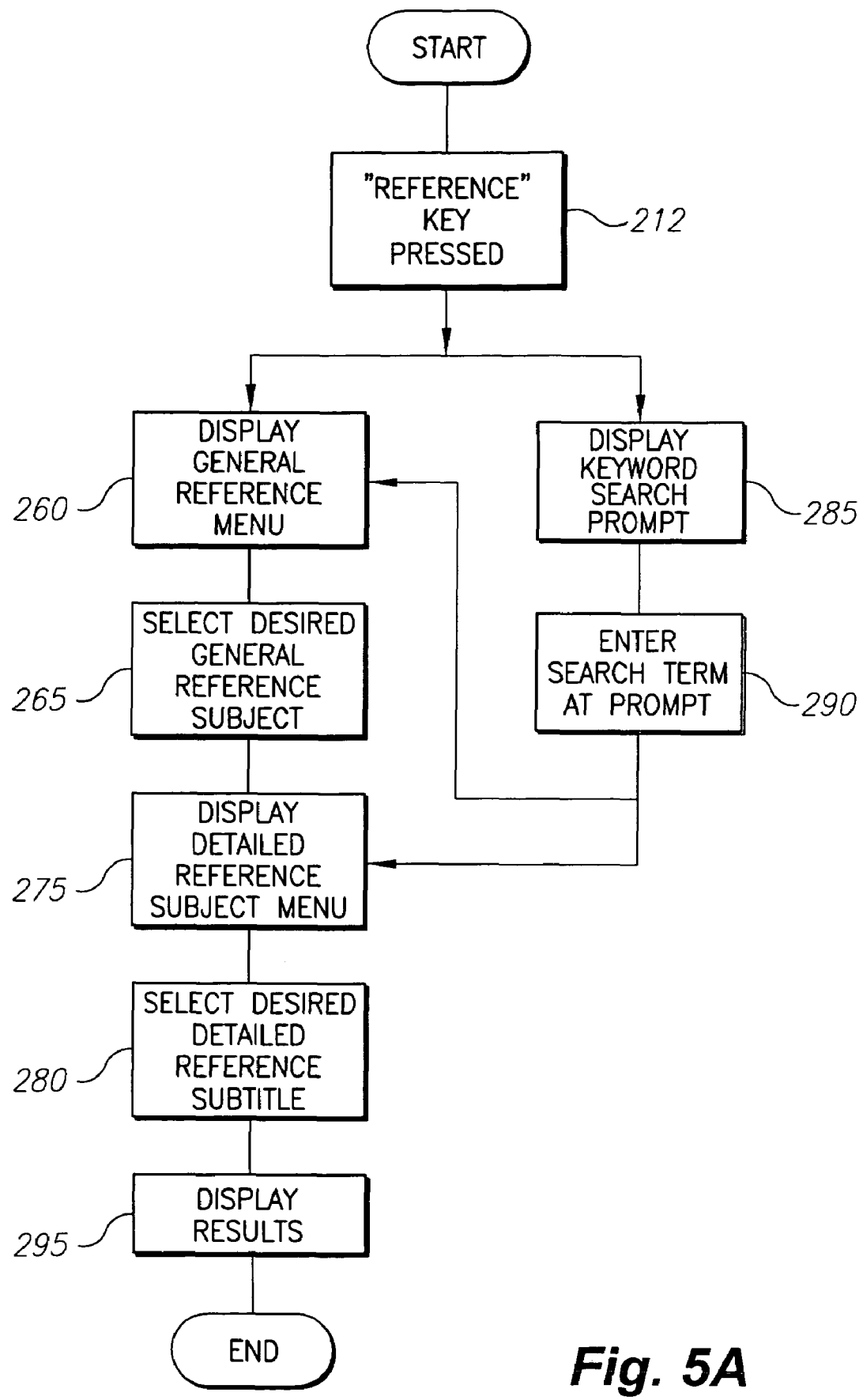
FIG. 5A is a flow chart for operation of the "reference" key of the pipe reference and calculating device of the present invention.
Figure 5B:
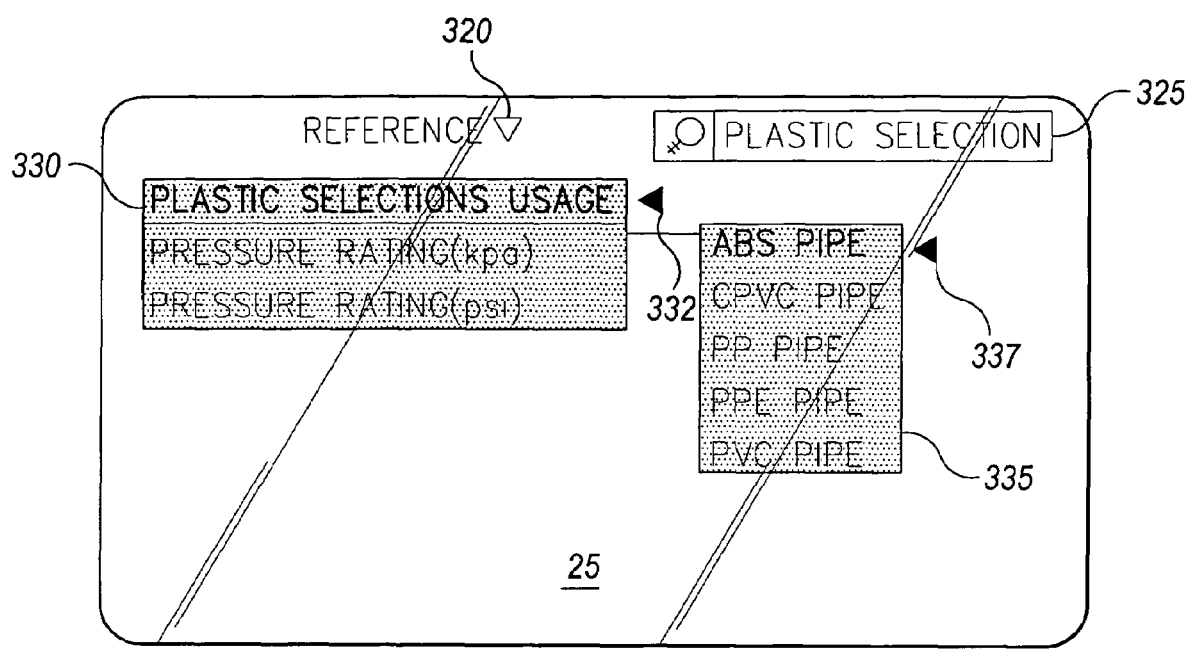
FIG. 5B is an example of a display screen resulting from pressing the "reference key" of the pipe reference and calculating device of the present invention.

FIGS. 5A-5B illustrate operation of the reference key 31. FIG. 5A shows a flow chart of operation when the reference key 31 is pressed. Upon pressing the reference key 31 at step 212, a general or broad list of reference subjects is provided at step 260. A keyword search prompt is simultaneously displayed adjacent a keyword text block at step 285, so that the user can obtain access to the desired reference information. This can occur by selecting menu entries at step 265 through operation of scroll keys 43, 47, and the enter key 51. This can also occur by pressing the tab 53 or horizontal scroll key 45 to move to the keyword search, and then using the alfa 27, alphanumeric 77, and enter 51 keys to perform a keyword search at step 290.

If a menu subject is selected at step 265, the user is presented with a further defined list of reference subjects under the first subtitle at step 275. Once a desired general reference subject has been chosen at step 280, the result is displayed at step 295. If the user entered a keyword search term at step 290, the user may be presented with a broad general reference menu at step 260, or a detailed reference subject menu at step 280, depending upon the keyword entered.

FIG. 5B provides an example of the display screen 25 resulting from the operation of the reference key 31. As described above, upon pressing the reference key 31, the processor 115 provides two methods of searching for desired reference material upon display screen 25, including a drop-down menu reference list 320 to scroll through providing general reference list menu 330. Only three reference topics are shown in the list box 330 in the drawing, the number of topics displayed being dependent upon screen size. The current selection may be indicated by highlighting the selection with bold print (as shown), by reverse video, by color-coding, by a selection arrow 332, or any other manner. Additional selections may be viewed by scrolling through the list using arrow keys 43 and 47 until the desired selection is highlighted, and then pressing the enter key 51.

The submenu list box 335 lists more detailed topics in the category selected, which is updated as the selection in the general menu list 330 is changed. In the example provided, the general drop-down reference menu list 330 is a plastics selections usage category, and the submenu 335 has more detailed topic categories of plastic pipes, including the subcategories of ABS, CPVC, PP, PPE, or PVC pipe. The currently selected subcategory topic may also be indicated by highlighting the selection in bold print (as shown), by reverse video, by color-coding, by a selection arrow 337, or any other manner. The user scrolls to the desired subcategory in submenu list box 335, selects the subcategory by pressing the enter key 51, and the desired reference information is displayed (not shown). An exemplary keyword search prompt 325 is also shown on the display screen 25 when the reference key 31 is pressed. The user may leave the reference mode by pressing the "calc" key 29.

Figure 6A:
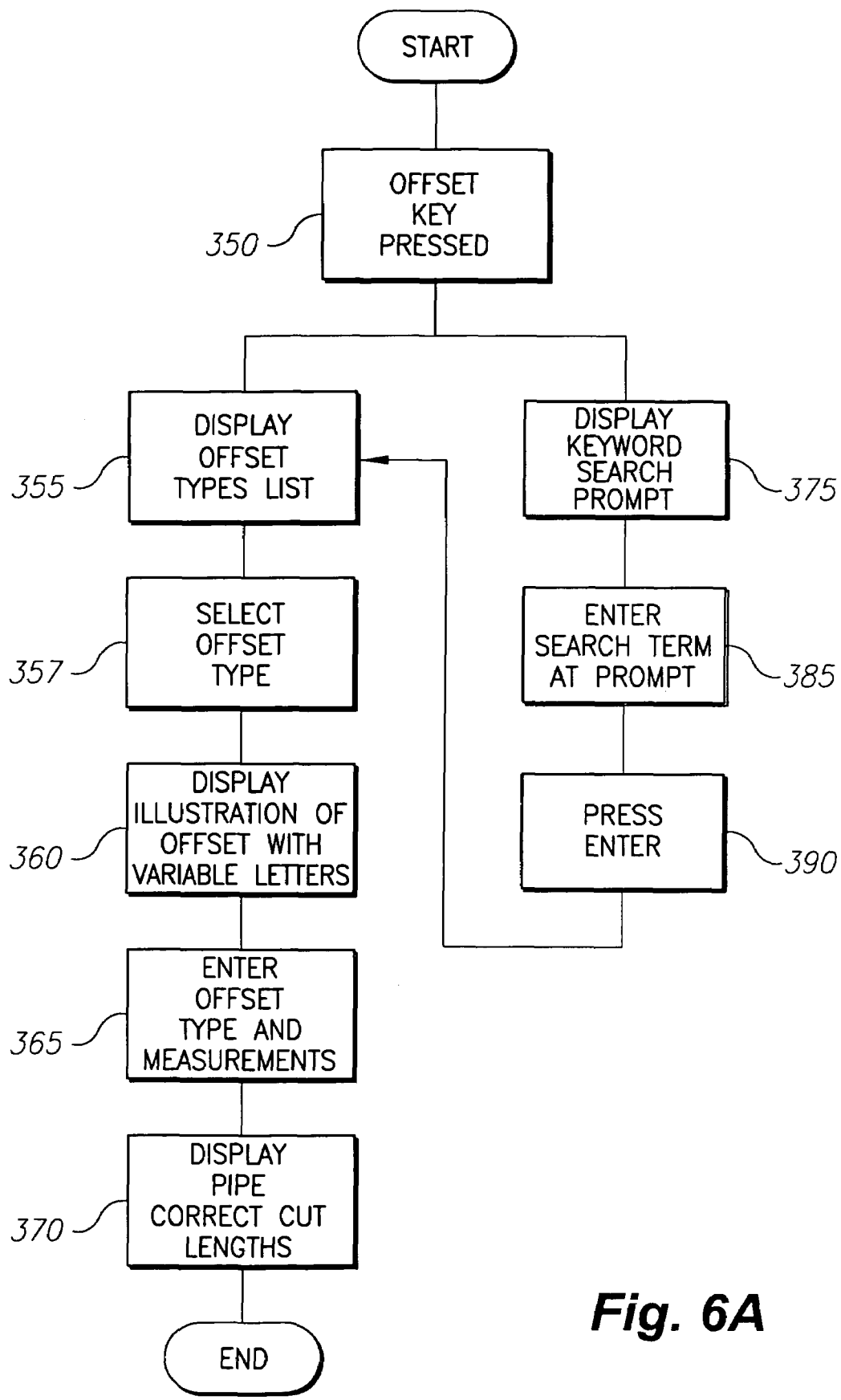
FIG. 6A is a flow chart for operation of the "offset" key of the pipe reference and calculating device of the present invention.

FIG. 6A shows a flow chart illustrating operation of the offset key 33. Upon pressing the offset key at step 350, the device 20 displays a list of offset types at step 355. An offset type may then be selected at step 357 in the same manner as a menu selection described with regard to FIG. 5B above. An illustration of the offsets with variables is then displayed at step 360. Each offset type and measurements for the offset are entered in step 365 for the processor 115 of the device 20 to calculate the pipe offset cut lengths in step 370. The result may be automatically calculated and displayed after entering sufficient measurements. Alternatively, a keyword search may be done at step 375 by tabbing to the keyword search prompt, entering the search term at step 385, and pressing the enter key 51 at step 390. The user is then directed to the display offset types list of step 355, which will display a portion of the offset list that includes the search term.

Figure 6B:
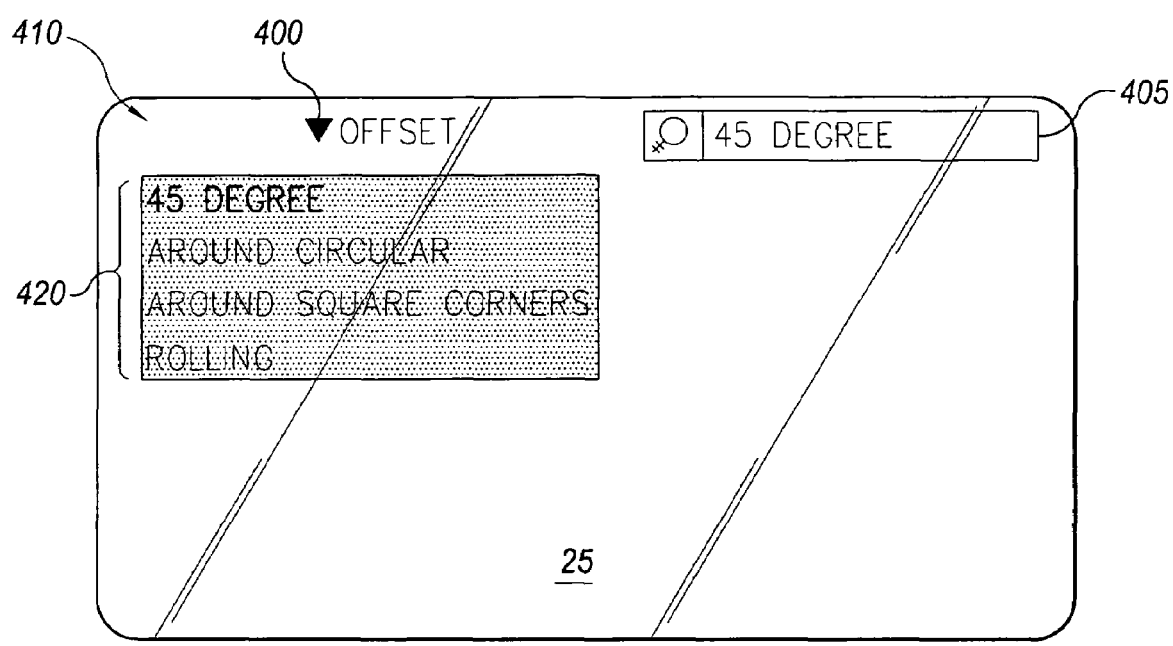
FIG. 6B is an example of a display screen resulting from pressing the "offset" key of the pipe reference and calculating device of the present invention.
Figure 6C:
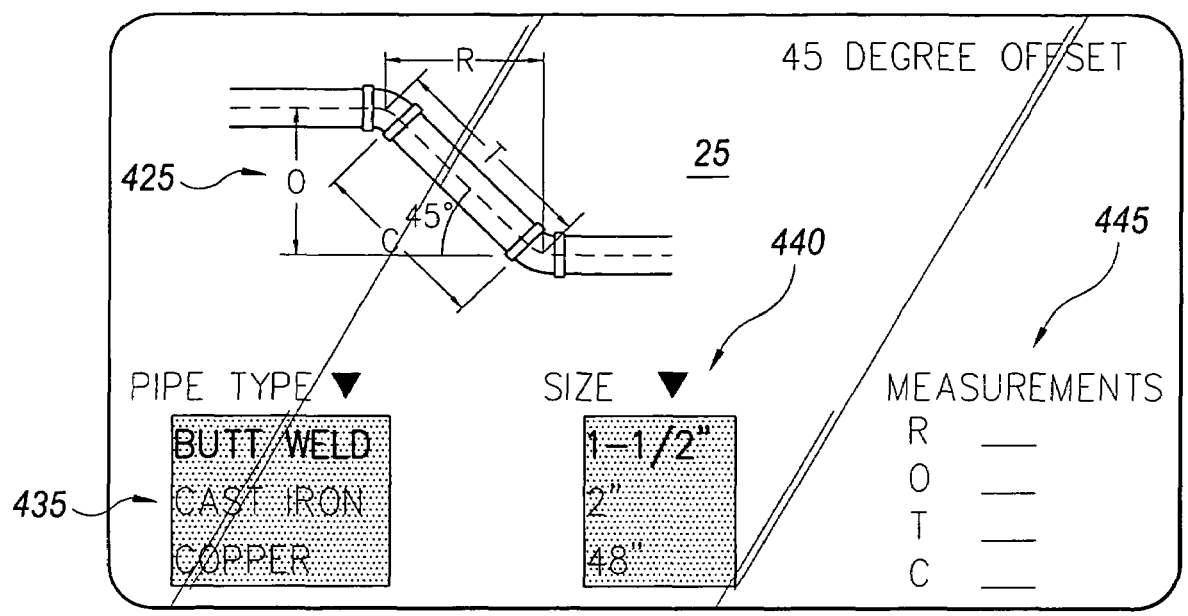
FIG. 6C is an example of a display screen for a 45o offset calculation using the pipe reference and calculating device of the present invention.

FIGS. 6B-6C provide an example of the display screens 25 resulting from the operation of the offset key 33. In FIG. 6B, an example of a search for a 45° offset is implemented. The search is carried out by selecting 45° offset from list menu 420. Alternatively, a search for a 45° offset may be input into search prompt 405. In FIG. 6C, an illustration of the display screen 25 which appears when a 45° offset calculation is shown to include a graphical illustration 425 of a 45° pipe offset provided with variable letters where the measurements are to be taken for the run R or offset O, and for the location of the travel T to be calculated. A corresponding list of variable letters 445 is below the illustration.

The user is prompted to enter the pipe type (i.e. cast iron, butt weld, copper, etc.) at list box 435 and size of pipe being worked with (i.e., 2", 1½", 48", etc.) via list box 440. Upon tabbing to the variable letters 445 and typing in either the run or the offset value and the enter key 51, the calculator computes and displays the center-to-center travel length T and cut length C. The calculator automatically subtracts the take outs from T and this is represented by C. Other standard pipefitting offset calculations, such as around circular, around square corners, and rolling offsets, are performed in similar fashion using the offset key 33 to access the appropriate software routine as described above.

Figure 7A:
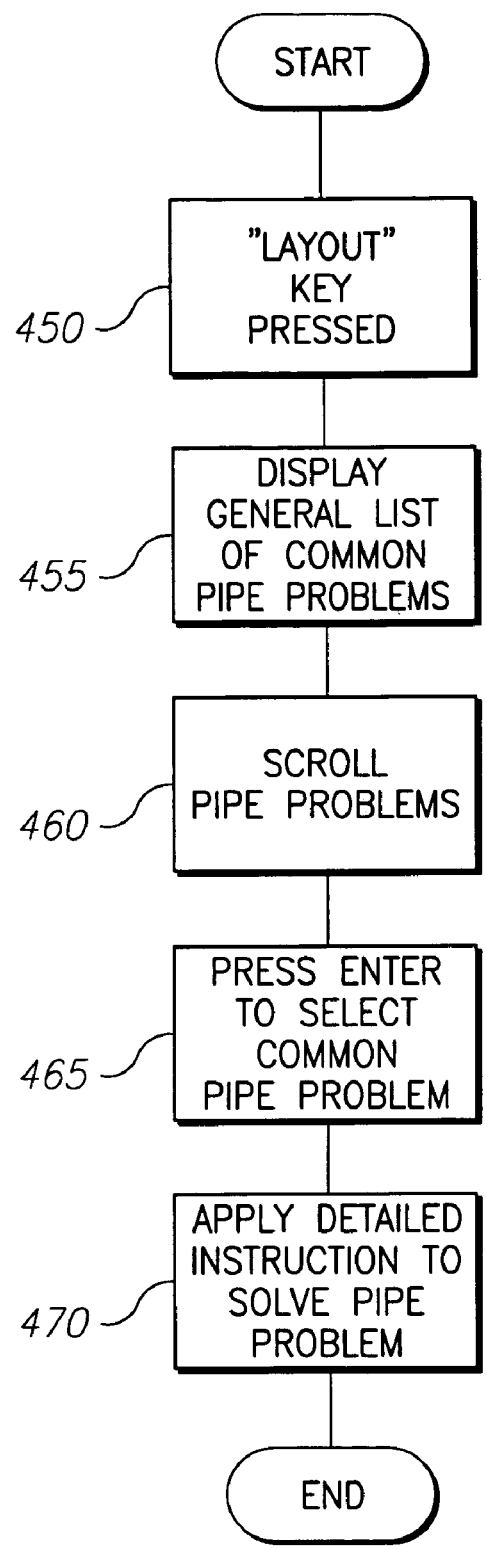
FIG. 7A is a flow chart for operation of the "layout" key of the pipe reference and calculating device of the present invention.
Figure 7B:
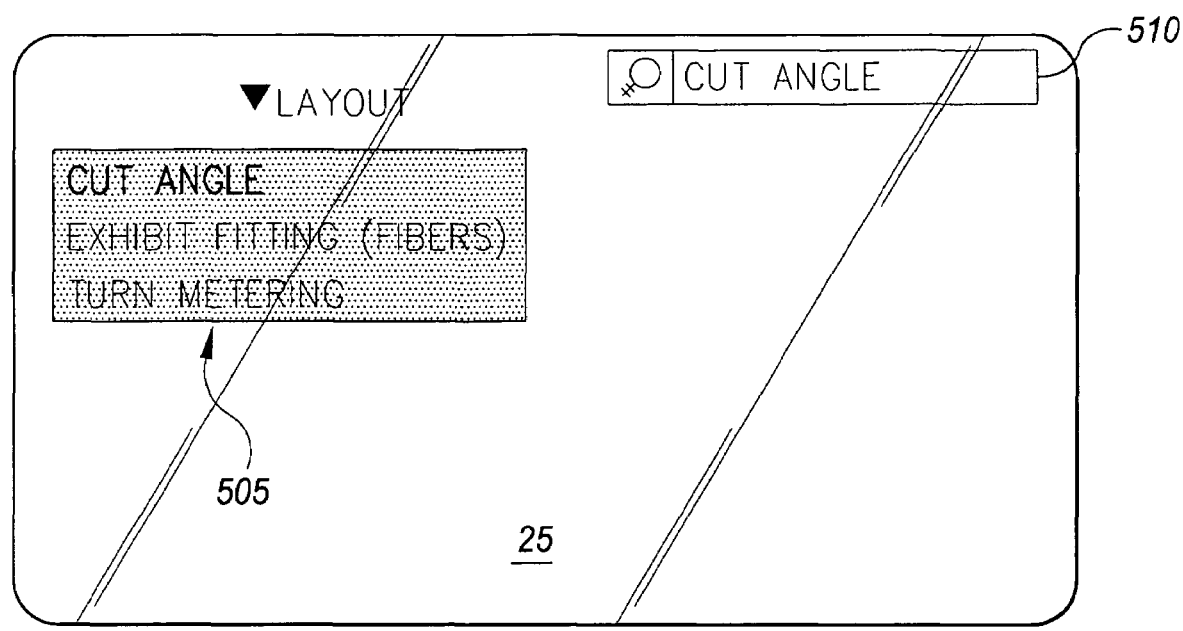
FIG. 7B is an example of a display screen resulting from pressing the "layout key" of the pipe reference and calculating device of the present invention.

FIG. 7A shows a flow chart illustrating operation of the device 20 when the layout key 35 is pressed at step 450. Upon pressing the layout key 35, a list of common piping problems is displayed on the screen at step 455 so that the user may scroll through the list at step 460. The user selects the pipe problem at step 465 by pressing the enter key 51, and the device 20 displays detailed instructions to solve the pipe problem at step 470. FIG. 7B provides an example of the display screens 25 resulting from a search for common piping layout problems. The search for common piping layout problems is performed by conducting a keyword search via prompt 510 or common piping problems layout drop down list menu 505. In the example, a cut angle is selected from the drop down list menu 505.

Figure 8A:
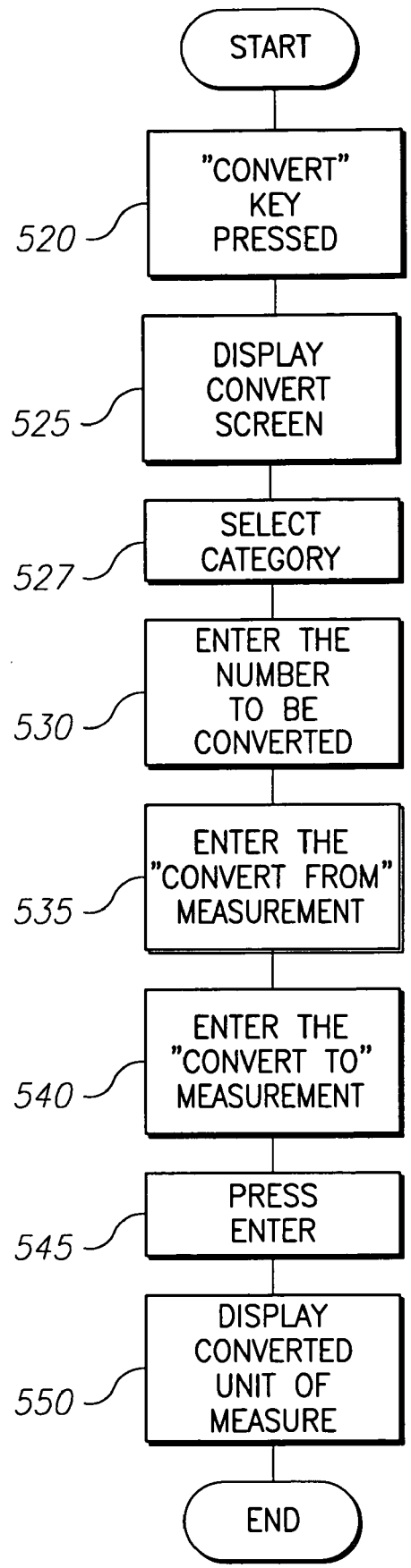
FIG. 8A is a flow chart for operation of the "convert key" of the pipe reference and calculating device of the present invention.

FIG. 8A shows a flow chart describing the operation of the convert key 57. Upon pressing the convert key 57 at step 520, the device displays a convert screen at step 525, as exemplified in FIG. 8B. The user moves the cursor or focus to select a category of measurement (e.g., distance, weight, etc.) and enters the selection at step 527 by pressing the enter key 51. The user then enters the number to be converted at step 530 and the units of measurement at step 535. The user then enters the desired units of measurement the number is to be converted to at step 540, presses the enter key at step 545, and the device 20 performs the conversion and displays the numerical result in the desired units of measurement at step 550.

Figure 8B:
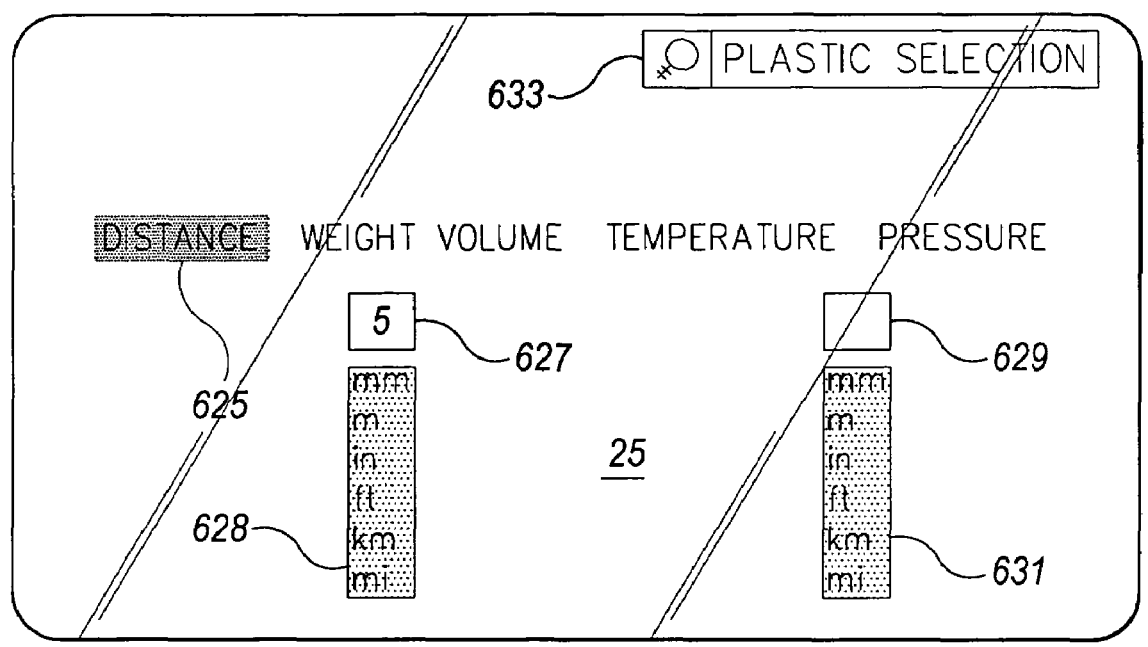
FIG. 8B is an example of a display screen resulting from pressing the "convert" key of the pipe reference and calculating device of the present invention.

FIG. 8B provides an exemplary display screen 25 that appears when the convert key 57 is pressed. A menu 625 of categories of units of measurement is displayed across the top of the screen 25. The user may select the desired category by tabbing and operation of the arrow cursor control keys to highlight the desired category, and then select the category by pressing the enter key 51. A first edit box 627 is provided for entering the numerical units of the quantity to be converted, and a list box 628 or scrollable list box is presented beneath the edit box 627 for selection of the dimensional units of the quantity to be converted. A second edit box 629 or a text box is provided adjacent the first edit box 627 for display of the numerical result, and a second list box 631 is provided beneath edit box 629 for selection of the dimensional units desired. The screen 25 may also include a keyword search prompt 633 for help in measurement units or other aspects of operation of the convert key 57.

Figure 9A:
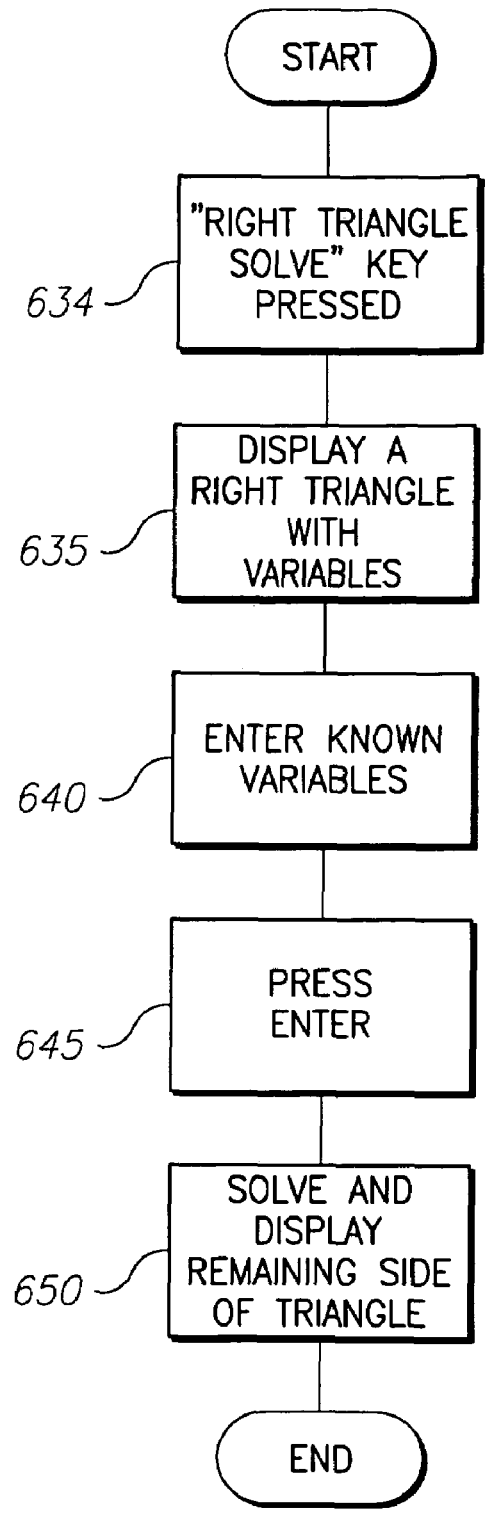
FIG. 9A is a flow chart for operation of the "right triangle solve" key of the pipe reference and calculating device of the present invention.

FIG. 9A shows a flow chart of the operation of the right triangle solve key 67. Upon pressing the right triangle solve key 67 at step 634, the device 20 displays a screen 25 having a graphical depiction of a right triangle with variables labeling the sides and angles of the triangle and edit boxes for entry of the known values at step 635. The known variables are entered at step 640. The enter key 51 is pressed at step 645, and the device computes the unknown value and displays the results at step 650.

Figure 9B:
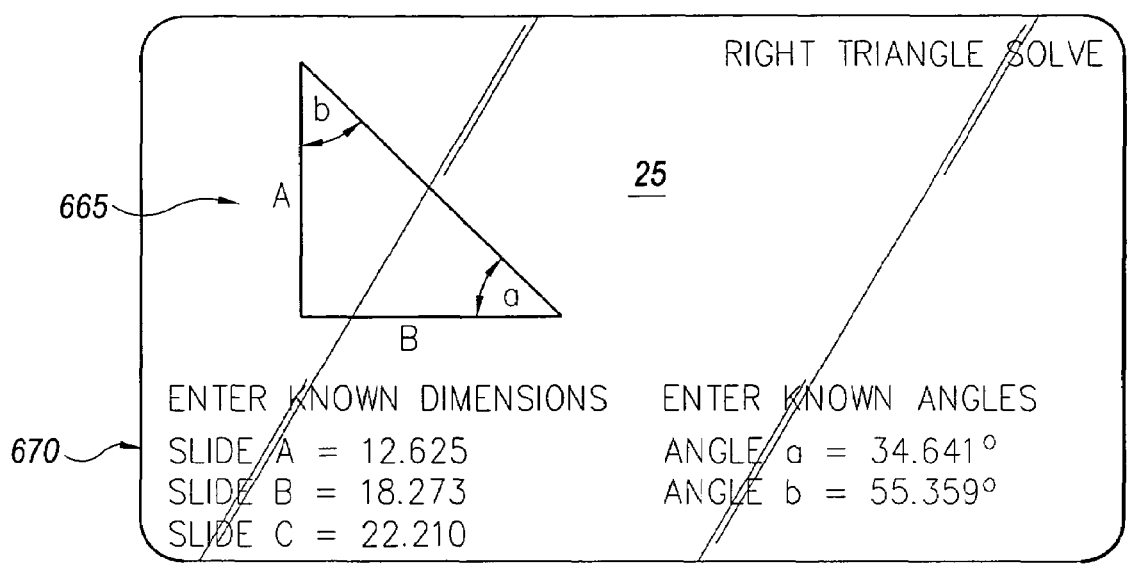
FIG. 9B is an example of a display screen resulting from pressing the "right triangle solve" key of the pipe reference and calculating device of the present invention.

FIG. 9B is an exemplary display screen 25 showing the right triangle solve key in operation. Pressing the right triangle solve key 67 results in a display screen having a graphical image 665 of a right triangle. All of the sides and angles are labeled with variables. Below the triangle 665, there is a corresponding list of variables 670. The user types in the known parts within the list of variables 670, and the device 20 solves the remaining sides and angles. The user navigates between the variables using the tab key 53 and arrow cursor control keys 43, 45, 47, and 49. The screen 25 may have an edit box next to the variable currently having the focus, or the screen 25 may simply have a blinking underscore or cursor next to the variable having the focus to prompt for entry of a measurement, the user entering the numerical digits followed by the enter key 51.

Figure 10A:
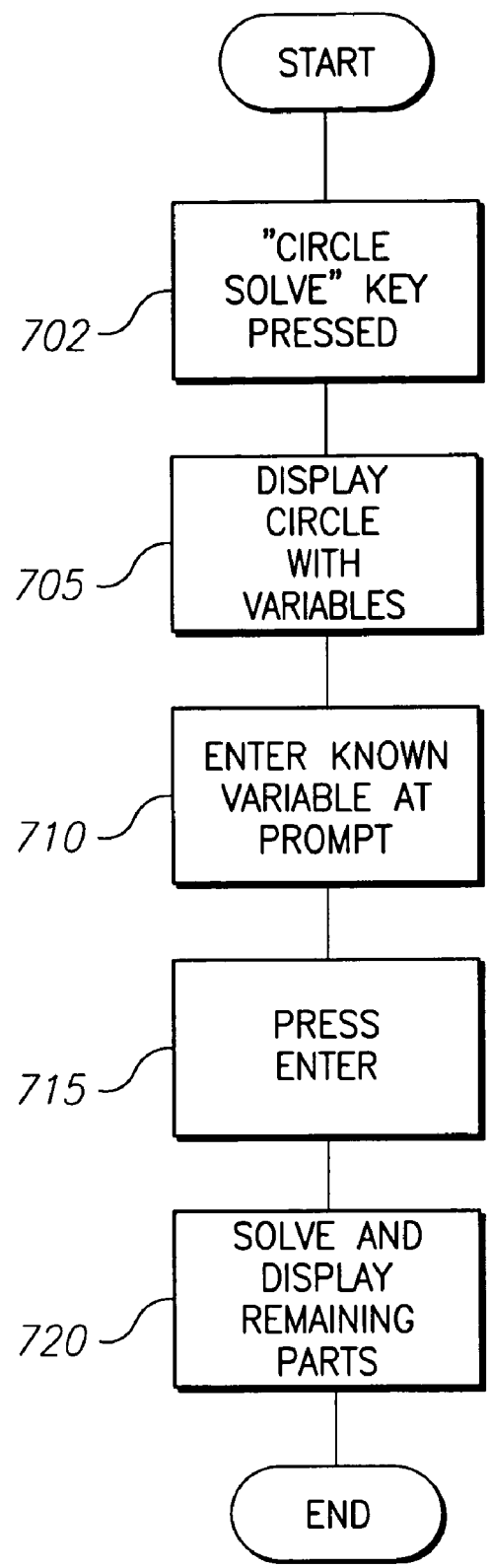
FIG. 10A is a flow chart for operation of the "circle solve" key of the pipe reference and calculating device of the present invention.

FIG. 10A shows a flow chart describing operation of the circle solve key 71. Upon pressing the circle solve key 71 at step 702, the device 20 presents a display screen 25 having a graphical image of a circle with variables noted on the figure and a list of variables for entry of known measurements at step 705. The known variables are input at step 710. After the enter key 51 is pressed at step 715, the device 20 computes and displays the remaining unknown parts of the circle at step 720.

Figure 10B:
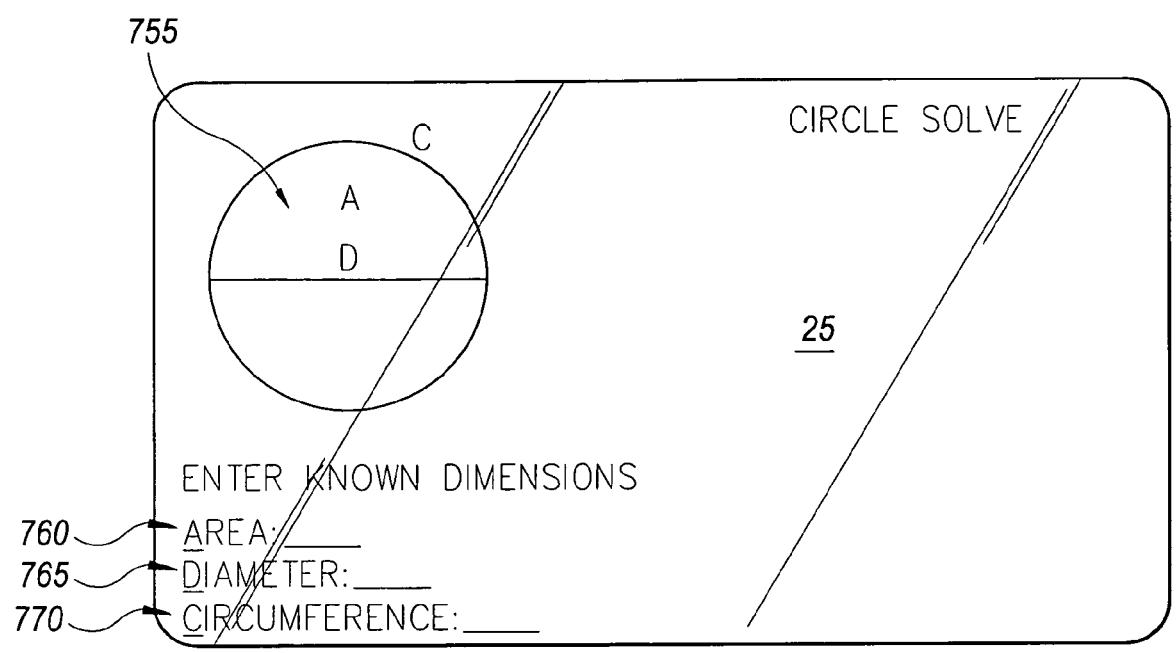
FIG. 10B is an example of a display screen resulting from pressing the "circle solve" key of the pipe reference and calculating device of the present invention.

FIG. 10B shows an exemplary display screen 25 illustrating operation of the circle solve key 71. Pressing the circle solve key 71 produces a display screen 25 having a graphical image of a circle 755. All parts of the circle 755 are labeled with a variable. A corresponding list of variables, such as the area 760, diameter 765, and circumference 770, etc., are below the circle 755. The user types in the known parts of the circle and the device 20 solves the remaining parts of the circle 755.

Figure 11A:
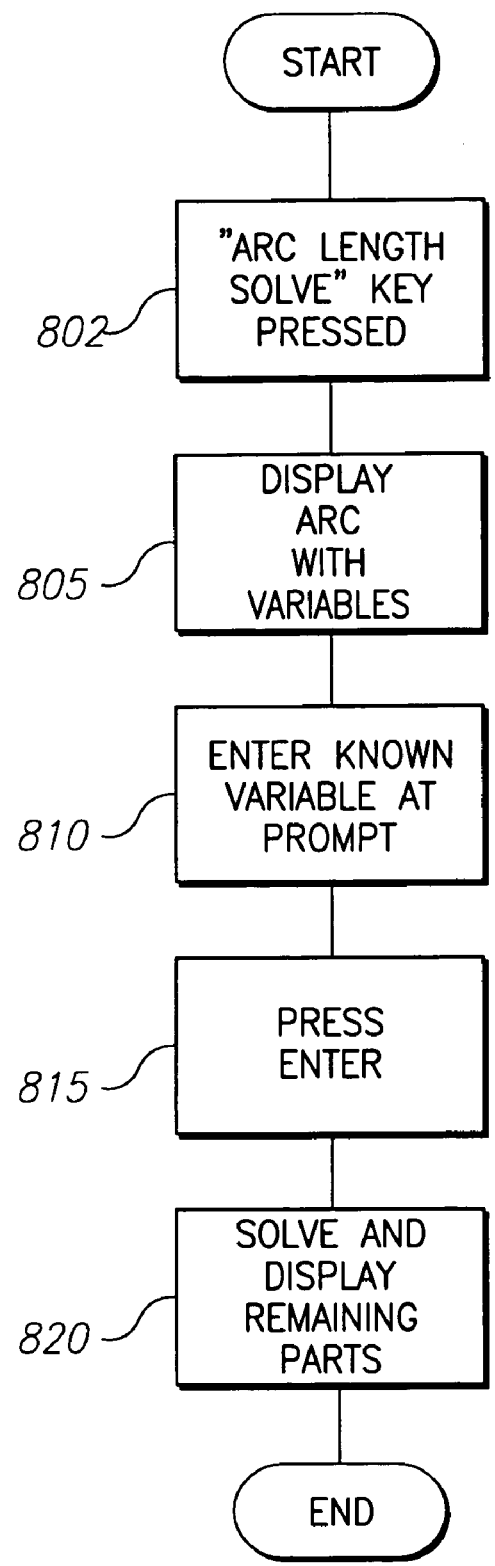
FIG. 11A is a flow chart for operation of the "arc solve key" of the pipe reference and calculating device of the present invention.

FIG. 11A shows a flow chart describing operation of the arc solve key 75. Upon pressing the arc solve key 75 at step 802, a graphical image of an arc is displayed labeled with variables along with a list of variables for entry of the known values at step 805. The known variables are entered at step 810. After pressing the enter key 51 at step 815, the device 20 computes and displays the unknown remaining parts of the arc at step 820.

Figure 11B:
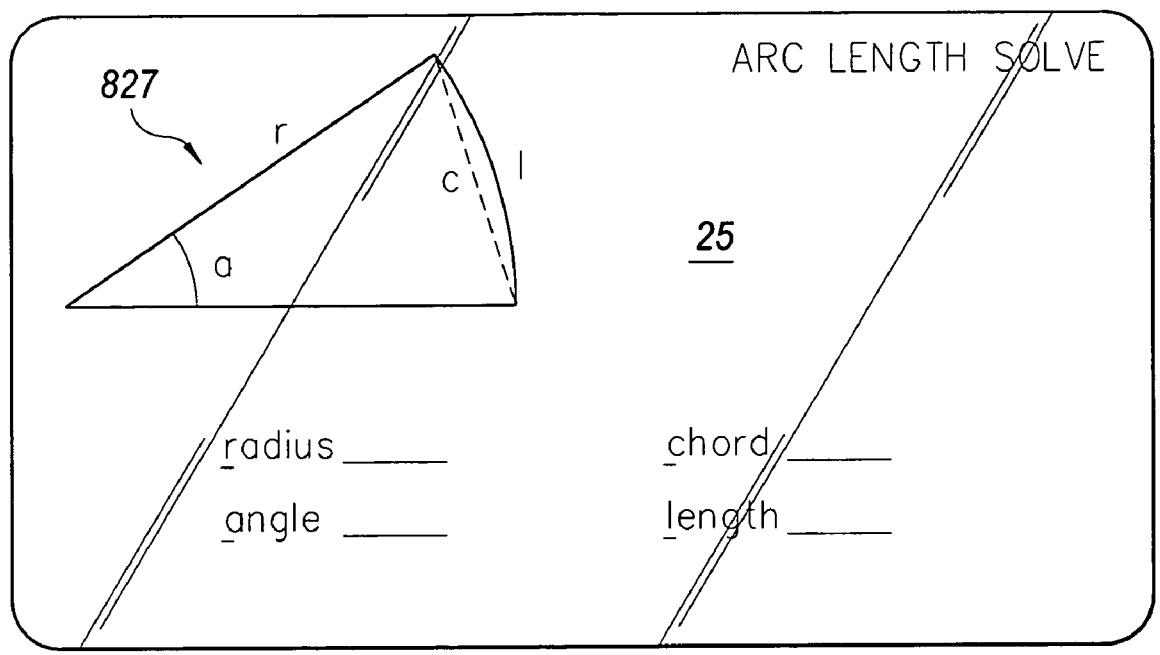
FIG. 11B is an example of a display screen resulting from pressing the "arc solve key" of the pipe reference and calculating device of the present invention.

FIG. 11B shows an exemplary display screen 25 illustrating operation of the arc length solve key 75. Pressing the arc key 75 causes the device 20 to present a graphical image of an arc 827 on the display 25. All parts of the arc 827 are be labeled with variables. Below the arc 827 is a corresponding list of variables 830, e.g., radius, angle, chord, and arc length. The user enters numerical digits for the known values, either into an edit box or at a blinking cursor. Upon pressing the enter key 51, the calculated value for the arc length is displayed in the variable list 830.

It will be understood that the display screens shown in the drawings are exemplary only, and that details of the display screen 25 and the interface for the entry of data and menu displays may vary in different implementations of the present invention, provided that the display screen 25 shows graphical images labeled with variables to provide an easy to use interface for solving pipefitting calculations.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A pipe reference and calculating device comprising:
   a housing dimensioned and configured for being held in a hand of a user;
   a processor contained within the housing;
   a keypad on the housing and electrically connected to the processor, the keypad operating a plurality of switches, each switch controlling a circuit to produce an input signal to the processor for a desired function;
   a display screen disposed in the housing and electrically connected to the processor;
   a memory device disposed in said housing and electrically connected to the processor; and
   software stored in the memory device, wherein the software, when executed by the processor, causes the processor to carry out steps comprising:
      accessing a data from a database of pipe reference information and data, and formulas;
      performing pipefitting calculations with data accessed from the database;
      performing calculations on data input from the keypad; and
      performing pipefitting and geometric calculations using graphical images with labeled variables.

2. The pipe reference and calculating device according to claim 1, wherein said software further causes the processor to carry out steps comprising:
   configuring said device in a calculator mode; and
   configuring said device in a reference mode.

3. The pipe reference and calculating device according to claim 2, wherein said configuring said device in a reference mode step further causes the processor to carry out steps comprising:
   providing a list of reference subjects; and
   providing a keyword search prompt.

4. The pipe reference and calculating device according to claim 2, wherein said configuring said device in a reference mode step further causes the processor to carry out steps comprising: providing a drop-down reference menu list.

5. The pipe reference and calculating device according to claim 4, wherein said providing a drop-down reference menu list step further causes the processor to carry out steps comprising:
   providing a plastics selections usage list.

6. The pipe reference and calculating device according to claim 5, wherein said providing a plastics selections usage list step further causes the processor to carry out steps comprising:
   providing subcategories of ABS, CPVC, PP, PPE, or PVC pipe.

7. The pipe reference and calculating device according to claim 2, wherein said configuring said device in a reference mode step further causes the processor to carry out steps comprising:
   displaying a list of common piping problems upon detection depression of a of layout key.

8. The pipe reference and calculating device according to claim 1, wherein said performing pipefitting and geometric calculations step further causes the processor to carry out steps comprising:
   displaying a list of offset types for pipes.

9. The pipe reference and calculating device according to claim 8, wherein said displaying a list of offset types for pipes step further causes the processor to carry out steps comprising:
   displaying illustrations of offset types with variables.

10. The pipe reference and calculating device according to claim 1, wherein said displaying illustrations of offset types with variables step further causes the processor to carry out steps comprising:
    receiving entered offset type and measurements for an a particular offset;
    automatically calculating a pipe offset cut length result; and
    displaying the calculated pipe offset cut length result.

11. The pipe reference and calculating device according to claim 10, wherein said receiving entered offset type and measurements for an a particular offset step further causes the processor to carry out steps comprising:
    receiving entered circular offset type and measurements for an a particular circular offset.

12. The pipe reference and calculating device according to claim 10, wherein said receiving entered offset type and measurements for an a particular offset step further causes the processor to carry out steps comprising:
    receiving entered square corner offset type and measurements for an a particular square corner offset.

13. The pipe reference and calculating device according to claim 10, wherein said receiving entered offset type and measurements for an a particular offset step further causes the processor to carry out steps comprising:
    receiving entered rolling offset type and measurements for an a particular rolling offset.

14. The pipe reference and calculating device according to claim 1, wherein said plurality of switches includes a right triangle solve switch.

15. The pipe reference and calculating device according to claim 1, wherein said plurality of switches includes a circle solve switch.

16. The pipe reference and calculating device according to claim 1, wherein said plurality of switches includes an arc solve switch.

* * * * *